Jan. 6, 1953     E. G. GRINHAM ET AL     2,624,328
INTERNAL-COMBUSTION ENGINE

Filed Aug. 3, 1950                    3 Sheets-Sheet 1

Inventors
E.G. GRINHAM &
By H.G. WEBSTER
Mawhinney & Mawhinney
Attorneys

Jan. 6, 1953 E. G. GRINHAM ET AL 2,624,328
INTERNAL-COMBUSTION ENGINE
Filed Aug. 3, 1950 3 Sheets-Sheet 2

INVENTORS
E. G. GRINHAM &
H. G. WEBSTER
by Mawhinney & Mawhinney
Attys.

Patented Jan. 6, 1953

2,624,328

UNITED STATES PATENT OFFICE 2,624,328

INTERNAL-COMBUSTION ENGINE

Edward G. Grinham and Henry G. Webster, Coventry, England, assignors to The Standard Motor Company Limited, Coventry, England Application August 3, 1950, Serial No. 177,428
In Great Britain October 21, 1949

5 Claims. (Cl. 123—193)

This invention relates to an internal-combustion engine, and particularly to a compression-ignition engine of the kind in which the upper end of the cylinder bore communicates with a lateral recess, on one side of the bore, forming part of the combustion chamber at the top-dead-centre position of the piston, the piston rings being mounted in grooves which are all below that part of the piston head which is exposed to the recess at the top-dead-centre position.

(In the present specification we are regarding the engine as being a "vertical" one with the combustion chamber vertically above the crankshaft, and the expressions "top," "upper" and the like are used from that point of view.)

We have found that there is a tendency for carbon deposit to form on that part of the piston head periphery which is above the topmost piston ring, particularly that part which is exposed to the said recess in a compression-ignition engine of the kind specified; and in due course that part tends to become a tight fit in the cylinder bore and capable of rubbing against the working surface against which the piston rings operate. With some kind of fuels having a relatively high percentage of sulphur, this deposit may be a very hard one and lead to scoring of the cylinder bore, causing the piston rings also to score and resulting in excessive lubricating oil consumption, loss of compression and poor performance in general.

The main object of the invention is to prevent this from happening.

The invention broadly consists in this, that the cylinder bore is of less diameter at the upper end (above the topmost piston ring at the top-dead-centre position of the piston), though not necessarily of constant diameter at this end, than along the rest of its length, and the piston is likewise stepped at its upper end so as to have radial clearances, at the top-dead-centre position, which are, at least, not less than the normal.

The term "normal radial clearances" means those which are at present commercially used, depending upon the working temperatures likely to be encountered and upon the materials of which the piston and cylinder are formed.

In the accompanying diagrammatic drawings.

Like reference numbers are applied to similar parts throughout the drawings.

Figure 2:
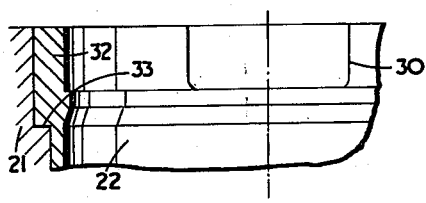
Figure 2 is a fragmentary section, with the piston omitted, taken on the line 2—2 of Figure 3.
Figure 3:
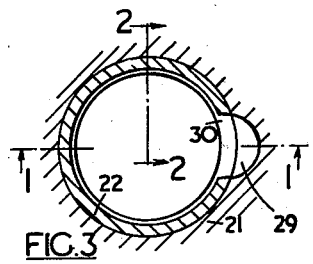
Figure 3 is a sectional plan (to a smaller scale) taken on the line 3—3 of Figure 1.
Figure 1:
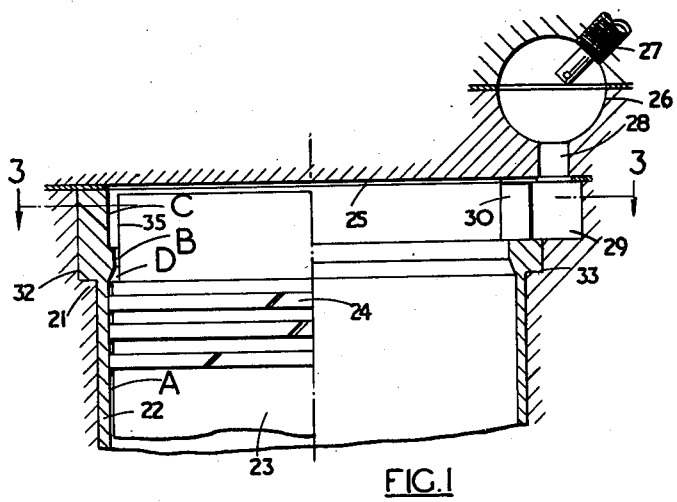
Figure 1 is a fragmentary sectional elevation of a compression-ignition engine, of the kind specified, arranged according to the invention, the section being taken on the line 1—1 of Figure 3, with the piston clearances exaggerated.
Figure 4:
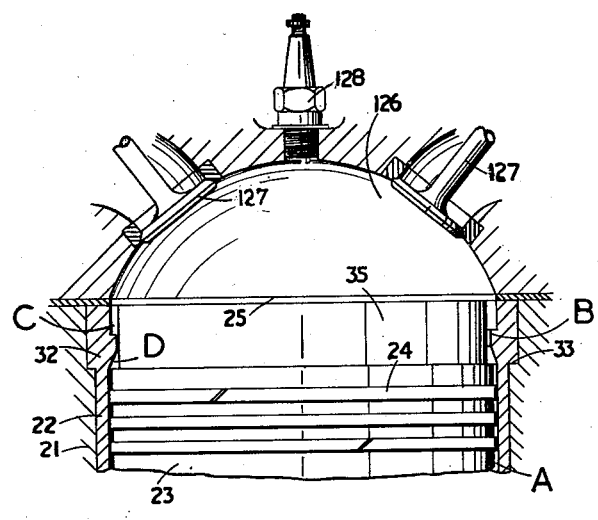
Figure 4 is a fragmentary sectional elevation of a spark-ignition engine arranged according to the invention, with the piston clearances exaggerated.
Figure 5:
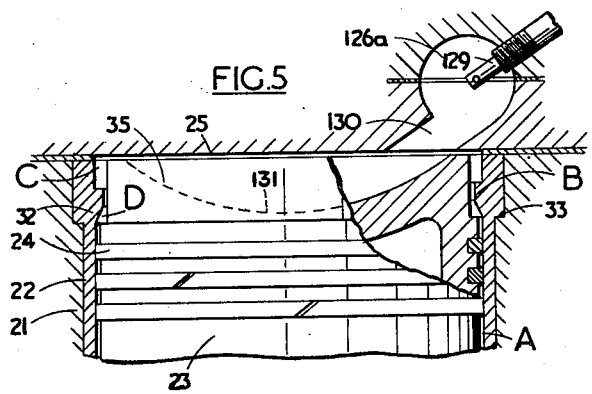
Figure 5 is a similar view of another kind of compression-ignition engine arranged according to the invention.

Figures 1 to 5 show a cylinder block 21 with a liner 22 in it providing a bore for a piston 23 carrying piston rings, of which the topmost is marked 24. At the top-dead-centre position of the piston (as shown by Figures 1, 4 and 5) the piston head approaches the adjacent face 25 of the cylinder head with a minimum of clearance.

In Figures 1 to 3 the combustion space comprises a generally spherical cavity 26, with a fuel injector 27 extending thereinto, joined by a passage 28 to a lateral recess 29 in the cylinder block, the recess communicating with the cylinder bore through a port 30 in the upper end of the liner.

In Figure 4 the combustion space comprises a generally hemi-spherical cavity 126, with valves 127 and a sparking plug 128 therein. In Figure 5 it comprises a generally spherical cavity 126a, with a fuel injector 129 extending thereinto, joined by a passage 130 to a recess 131 scooped out of the piston head.

In Figures 1 to 5 the liner is a push fit in the cylinder bore, and it has an external flange 32 at its upper end to rest on an annular seating 33 provided in the bore.

In Figures 1 to 3 it is through one side of the flanged end that the port 30 is cut to provide access to the lateral recess 29, the port preferably being substantially co-extensive with the adjacent opening to the recess. By arranging for the piston to approach the adjacent face 25 of the cylinder head with a minimum clearance (such as is necessary for mechanical reasons), a very considerable "squish" effect is provided through the upper edge of the port as the top-dead-centre position is being reached.

In the drawings, A represents the normal main portion of the cylinder bore and B the portion at the upper end which is of less diameter than the normal, whilst at C, just above the portion B, the diameter of the bore is again normal. At D the bore tapers. The piston head is of reduced diameter at 35 down to a level just above the topmost ring 24 of the piston rings.

For a piston of a diameter over the main part of its length of, say, 3″ (7.62 cm.), and formed of a good quality light alloy, the piston operating in a good quality cast-iron liner, the diametral reduction of the bore at B may be about 0.01″ (0.25 cm.), and the diametral reduction of the piston head, at 35, may be about 0.021″ (0.053 cm.). Assuming a diametral piston clearance over the main portion of its length (i. e., at A) of about 0.004″ (0.01 cm.), the diametral piston clearance (in the top-dead-centre position) is about 0.015″ (0.038 cm.) at B, and about 0.025″ (0.063 cm.) at C.

Naturally, if the upper end of the liner is reduced in diameter (at B) to a greater extent, the diameter of the relative part (35) of the piston head will also be reduced to the same greater extent—or, if desired, to a still greater extent. If the piston head is, in effect, materially undersized with respect to the portion B of the upper end of the cylinder bore, carbon deposit will build up upon the periphery to increase its diameter to a suitable working diameter without causing any ill effects. Any further increase in the thickness of the deposit is prevented by the piston head entering the minimum bore portion B of the upper end of the cylinder bore during its reciprocations.

Figure 6:
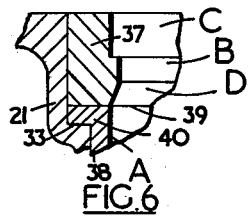
Figures 6 to 10 are fragmentary views showing how the upper end of the bore of any of the three engines shown can alternatively be formed by two liners, or partly by a liner and the cylinder block, or entirely by the latter, instead of by the liner of Figures 1 to 3, of Figure 4, or of Figure 5.

To facilitate machining, the liner may comprise two coaxial portions, as shown by Figure 6, namely, an upper portion 37 having the less-diameter portion B as aforesaid, and a lower portion 38, the joint 39 between the two taking place above the topmost piston ring at the top-dead-centre position of the piston. For mechanical reasons the lower portion should have a material part of the outward flange formed in it, when it is a push fit, as shown at 40.

Figure 7:
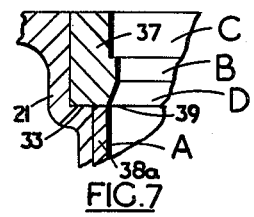

Alternatively, if preferred, the lower portion 38$a$ of the liner could be flangeless at its upper end, and shrunk into the bore of the cylinder block 21, as shown by Figure 7.

Figure 8:
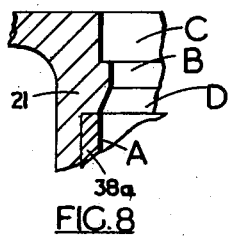

In another alternative the said upper portion of the bore, including the part B of reduced diameter, is provided by an integral part of the cylinder block 21, as shown by Figure 8, the main part of the bore being provided by a shrunk-in liner 38$a$ as aforesaid.

Figure 9:
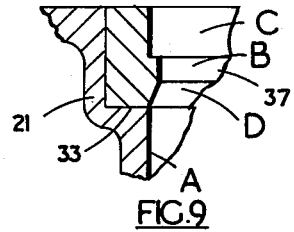

Alternatively, as shown by Figure 9, the converse arrangement may be used—i. e., a reduced-diameter liner 37 in a counter bore at the upper end of a bore, of greater diameter, in the cylinder block 21.

Figure 10:
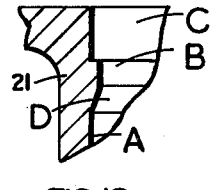

Or, of course, as shown by Figure 10, no liner or liner portions need be used, the different-diameter bores being provided by machining of the cylinder block 21.

Figure 12:
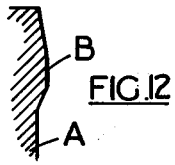
Figures 11 to 14 show alternative shapes the upper end of the bore may take.
Figure 13:
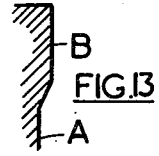
Figure 14:
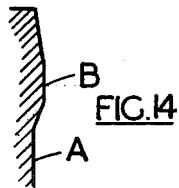
Figure 11:
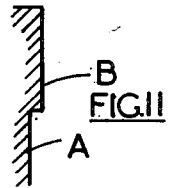

It will be understood that, if preferred, the whole of the said upper end of the cylinder bore could alternatively be of constant less diameter, as shown at B in Figure 11. Alternatively, it may taper from the upper extremity to a level at B at which the diameter is a minimum, this minimum diameter being maintained for a certain length and then diverging to join the upper extremity of the larger-diameter bore A, as shown by Figure 12. Or, the tapering portion at the upper extremity may be replaced by a portion of the said minimum diameter B, as shown by Figure 13. Figure 14 shows a further alternative. However, the bore shape of Figures 1 to 10 is preferred.

What we claim as our invention and desire to secure by Letters Patent of the United States is:

1. In an internal combustion engine, a cylinder having a bore formed with a constricted area intermediate its ends and disposed adjacent the upper end thereof and a piston working in the bore and having its upper end formed of a reduced diameter from the rest of the piston, said upper end being adapted to pass with clearance through the constricted area.

2. In an internal combustion engine, a cylinder having a bore formed with a constricted area intermediate its ends and disposed adjacent the upper end thereof and a piston working in the bore and having its upper end formed of a reduced diameter from the rest of the piston, said upper end being adapted to pass with clearance through the constricted area, said piston having piston rings carried in grooves in the piston and the reduced upper end of the piston being above the uppermost piston ring.

3. In an internal combustion engine, a cylinder having a bore formed with a constricted area intermediate its ends and disposed adjacent the upper end thereof and a piston working in the bore and having its upper end formed of a reduced diameter from the rest of the piston, said upper end being adapted to pass with clearance through the constricted area, said constricted area including a rib circumferentially formed in the bore of the cylinder and having an upper face extending at right angles from the cylinder wall to define a scraper for removing on the down stroke of the piston carbon deposits from the upper end of the piston.

4. In an internal combustion engine, a cylinder having a bore formed with a constricted area intermediate its ends and disposed adjacent the upper end thereof and a piston working in the bore and having its upper end formed of a reduced diameter from the rest of the piston, said upper end being adapted to pass with clearance through the constricted area, said constricted area including a rib circumferentially formed in the bore of the cylinder and having a portion defining a scraper to remove carbon deposits from the upper end of the piston on the down stroke thereof.

5. In an internal combustion engine, a cylinder having a bore formed with a constricted area intermediate its ends and disposed adjacent the upper end thereof and a piston working in the bore and having its upper end formed of a reduced diameter from the rest of the piston, said upper end being adapted to pass with clearance through the constricted area, the portions of the bore of the cylinder above and below the constricted area being of the same diameter.

EDWARD G. GRINHAM.
HENRY G. WEBSTER.

REFERENCES CITED

The following references are of record in the file of this patent:

UNITED STATES PATENTS

| Number | Name | Date |
|---|---|---|
| 1,332,888 | Corson | Mar. 9, 1920 |
| 1,835,490 | Hesselman | Dec. 8, 1931 |
| 1,838,495 | O'Neill | Dec. 29, 1931 |
| 2,066,580 | Severin et al. | Jan. 5, 1937 |
| 2,254,438 | McCarthy | Sept. 2, 1941 |